INVENTOR.
CHARLES A. WALL
BY Willis L. Vary
ATTORNEY

INVENTOR.
CHARLES A. WALL
BY
Willis L. Vary
ATTORNEY

United States Patent Office 3,213,413
Patented Oct. 19, 1965

3,213,413
METHOD AND APPARATUS FOR SEISMIC SURVEYING WITH RADIO LINK AND TIMING COUNTER
Charles A. Wall, Bethesda, Md., assignor to Wallco, Bethesda, Md., a corporation of Delaware
Filed Aug. 26, 1963, Ser. No. 304,447
9 Claims. (Cl. 340—15.5)

This invention relates to methods and apparatus for measuring the depth of strata and the composition and configuration thereof below the surface of the earth by seismological techniques.

It is well known in the science of seismology that the depth, composition, and configuration of strata can be determined to a large degree by the use of artificial seismic waves. When a seismic disturbance is created, a series of waves are generated and radiate in all directions from the point of disturbance. The waves are reflected and refracted from the various starta discontinuities. By measuring the time for the refracted waves to return to the earth's surface, useful information about the strata is obtained.

Known seismic devices exhibit numerous disadvantages. For example, they are relatively complex and difficult to operate. Further, these devices can only be operated over wire transmission lines.

Accordingly, it is an object of this invention to provide a radio operated seismic surveying apparatus.

It is a further object of this invention to provide a reverse polarity feature which permits extended depth determinations without an increase of seismic energy.

It is a still further object of this invention to provide seismic apparatus which operates with a high degree of accuracy.

These and various other objects and features of the invention will be more clearly understood from a reading of the detailed description of the invention in conjunction with the drawings in which.

Figure 1:
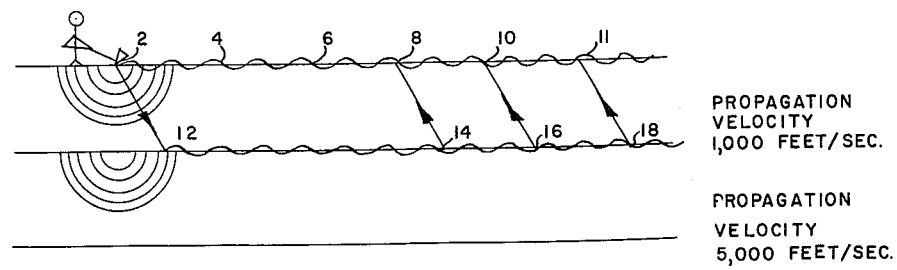
FIG. 1 is a pictorial representation of the method of seismic surveying employed with one illustrative embodiment of this invention.

Briefly, in accordance with aspects of this invention, the waves refracted from the discontinuities in the strata being investigated are utilized to provide information about these discontinuities. When a shock is created, in this case by a man striking the ground with a hammer, a series of waves propagate in all directions from the point of impact and travel at the speed of propagation of the material which is directly related to the density of the material. For example, the wave which travels along the surface may propagate at 1,000 feet per second because of the nature of the material. Similarly, the propagation velocity of the second layer may be 5,000 feet per second. If a seismic detector is placed at position 4 in the illustration which is 10 feet from the point of shock, the surface wave will arrive in 10 milliseconds. If the seismic detector is then moved to position 6, twenty feet from the point of shock and another shock is produced at point 2, the first arrival will require 20 milliseconds to reach the detector. The surface wave will require 30 milliseconds to traverse the 30 feet to point 8. However, a subsurface wave which traverses the path 2, 12, 14, 8 will arrive at position 8 before the surface wave due to the higher velocity of the second layer of material even though the subsurface wave must traverse a longer distance. Thus the first wave to arrive at position 8 will take 22 milliseconds instead of 30 milliseconds. If the seismic detector is now moved to position 10 and another shock is introduced at point 2 the first wave to arrive at the detector will follow path 2, 12, 16, 10 and will arrive in 24 milliseconds. If the seismic detector is now moved to position 11 the first wave to arrive will follow path 2, 12, 18, 11 and will arrive in 26 milliseconds.

Figure 2:
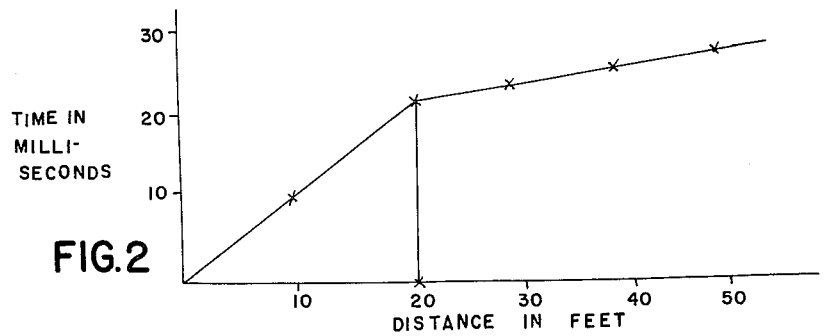
FIG. 2 is a graphical representation of plots made in performing the method of FIG. 1.

If the times for the first waves to arrive are now plotted on a graph of time vs. distance between seismic detector and point of shock introduction, as illustrated in FIGURE 2, the depth, D can be computed by means of the equation $$D = \frac{x}{2}\sqrt{\frac{V_2 - V_1}{V_2 + V_1}}$$

where $V_1$ is the velocity of propagation of the first layer, $V_2$ is the velocity of propagation of the second layer, and X is the point on the surface where both waves arrive simultaneously.

As the seismic detector is positoned farther and farther from the shock source, deeper layers will be detected in the same manner as the second layer was detected in the preceding example, provided each succeeding layer has a higher velocity of propagation than the layers above it.

In addition to indicating the depth to subsurface discontinuities, the velocities of propagation can be used to assist in determining the type and the condition of the subsurface material. For instance, a weathered layer which can be removed mechanically by ripping can be distinguished from a well consolidated layer which must be removed by blasting. By employing more detailed analysis of the data, more information can be obtained on the strata such as the location of faults in underground layers, the location of tunnels, and the location of many other types of discontinuities.

The apparatus for the collection of this data comprises three units of equipment. The first unit of equipment is a radio receiver, an accurate counter capable of counting in one-tenth millisecond increments, a logic network to cause the counter to begin counting upon receipt of a pulse from an external transducer and to stop counting on reception of a second pulse from the radio receiver. Provision is incorporated to allow resetting the counter to the zero position and to allow the counter to start and stop only once after resetting so as to preclude extraneous counts. The second piece of equipment to be considered is the seismic detector unit. This unit contains a seismic detector of high sensitivity, a high gain automatic gain controlled amplifier, and a gated radio frequency pulse transmitter. The third piece of equipment is an external transducer, or strike detector, connected electrically into the logic circuit such that, when energized by a hammer blow nearby, it will cause the counting cycle to start.

Figure 3:
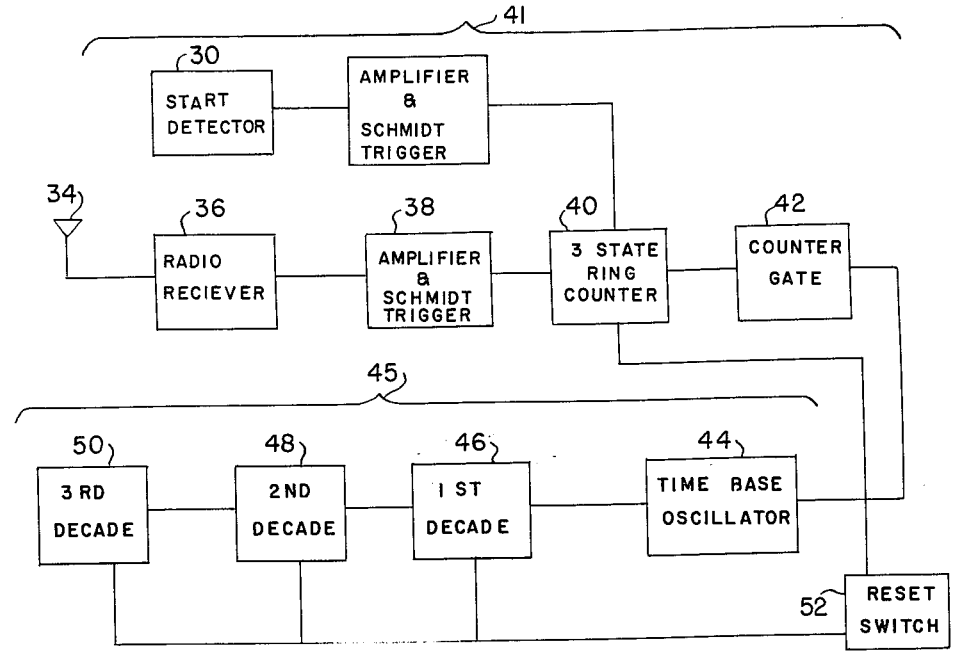
FIG. 3 is a block diagram of a radio received-logic-counter system including the associated power supply which defines a portion of one illustrative embodiment of this invention.

The block diagram of FIGURE 3 shows the relationship between receiver, logic and counter circuits. In operation, the three decade counting tubes 46, 48 and 50 are set at zero by the reset switch 52 which simultaneously sets the three-state ring counter logic network 40 for a "no count" condition. Thereafter, any pulse from the start detector 30 created by a hammer blow nearby will switch the three-state logic network 40 into a "count" mode. In this mode, the counter gate 42 becomes conducting and permits power to be applied to the time base oscillator 44 and the counting cycle begins. This counting cycle continues until a radio frequency signal is received by the receiver 36. When this occurs the ring counter is switched into a "stop and hold" mode. In this mode, the counter gate 42 becomes non-conducting thus removing power from the time base oscillator 44. Thus the counting cycle will be stopped and the time interval registered on the decade counter tubes 46, 48 and 50 will be retained until set to zero again by the reset switch 50.

Figure 4:
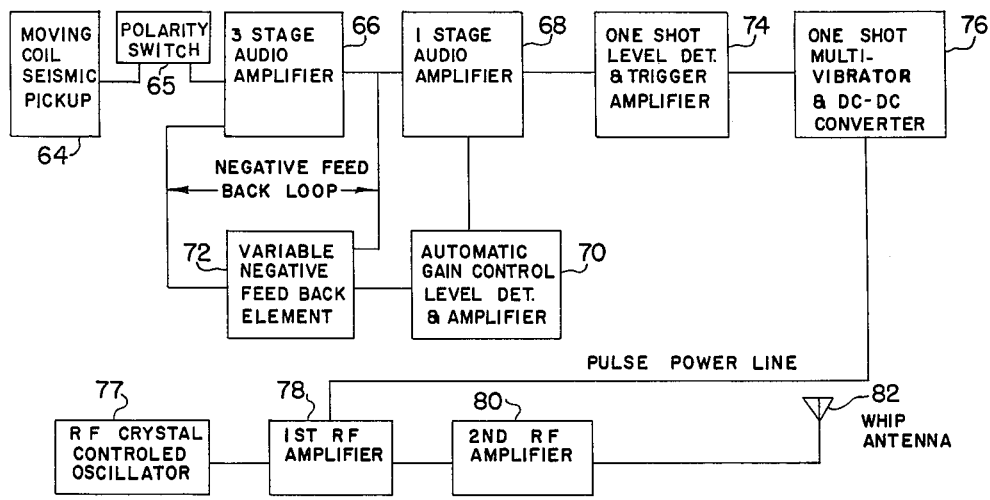
FIG. 4 is a block diagram of a seismic pickup-pulse transmitter defining a portion of one illustrative embodiment of this invention.

FIGURE 4 is a block diagram of the seismic detector, seismic amplifier and pulse transmitter unit of the system. The moving coil pickup 64 transmits a very feeble signal through polarity switch 65 to the three stage audio amplifier 66 where it is amplified and transmitted on to the one stage final audio amplifier 68. When amplified the signal is of sufficient amplitude to be peak detected in the automatic gain control level detector and amplifier. The automatic gain control detector 70 determines the amplitude of the seismic background and the automatic gain control amplifier amplifies the detected signal to a sufficient level to be fed as an error signal into the variable negative feedback element 72 thus varying the attenuation in the negative feedback loop and thereby varying the gain of three stage audio amplifier 66.

The one shot level detector and trigger amplifier 74 supplies the trigger power to one shot multivibrator and D.C. to D.C. converter 76. Preferably, the one shot level detector 74 is adjusted to a higher level of detection than that of the automatic gain control level detector 70.

A radio frequency crystal controlled oscillator 77 operates continuously from the five volt battery supply. The first and second radio frequency amplifiers 78 and 80 are normally off. When the one shot multivibrator and D.C. to D.C. converter 76 is triggered by the one shot level detector and trigger amplifier 74, power is applied to radio frequency amplifiers 78 and 80 for a period of approximately one millisecond. The radio frequency energy from radio frequency amplifier 80 is coupled into the antenna system 82 and is radiated to the receiver shown in FIG. 1.

A five volt battery, not shown, supplies the audio amplifiers, the automatic gain control amplifier, the crystal oscillator and the one shot multivibrator.

Figure 5:
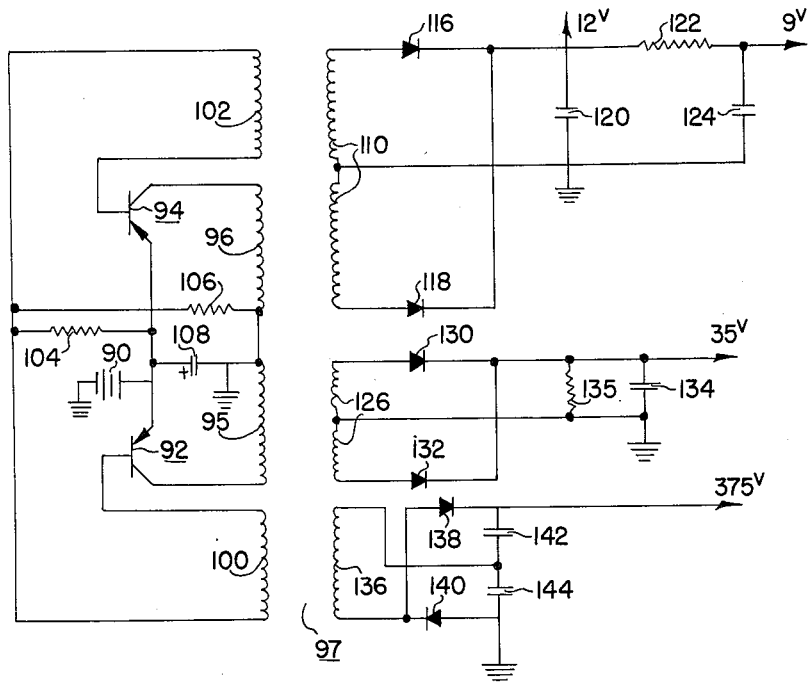
FIG. 5 is a schematic representation of one illustrative power supply which may be employed in the apparatus shown in block form in FIG. 1.

FIGURE 5 is a schematic representation of a power supply 60 which may be employed to supply power to the receiver and counter of FIG. 3. Power supply 60 has an input of five volts from battery 90 which is applied to the emitters of transistors 92 and 94 which are connected as an oscillator. The collectors of transistors 92 and 94 are at ground potential through windings 95 and 96, respectively, on transformer 97. Windings 100 and 102 are feedback windings for transistors 92 and 94, respectively. Resistor 104 controls the amount of feedback current from windings 100 and 102 which is applied to the bases of transistors 92 and 94. Resistor 104 provides a small amount of current to the bases of transistors 92 and 94 to facilitate starting of the oscillator. Capacitor 108 is a filter to absorb transients appearing across battery 90. The oscillator starts due to the current introduced into the bases of transistors 92 and 94. When a pulse occurs in one of the transistors 92 or 94, it starts to turn on and, due to the regenerative action from the proper feedback winding 100 or 102, the transistor 922 or 94, respectively, turns completely on and stays on until the core of transformer 97 saturates at which time the other transistor turns on and is held on by its feedback winding. When the core saturates, the transistor which is on turns off and the other transistor turns on, thus oscillation is sustained.

The secondary windings 110, 126 and 136 of transformer 97 provide the voltages necessary to the operation of the various parts of the unit including the receiver, logic, and decade counter. Center taped winding 110 in conjunction with diodes 116 and 118 provide twelve volts with full wave rectification which is filtered by capacitor 120 and supplies the logic. A portion of the twelve volt supply is filtered by resistor 122 and capacitor 124 and supplied to the receiver at a level of nine volts.

Center taped winding 126 in conjunction with diodes 130 and 132 provide thirty-five volts with full wave rectification which is filtered by capacitor 134, ballasted by resistor 135, and supplied to the decade counter. Winding 136 in conjunction with diodes 138 and 140 and capacitors 142 and 144 form a voltage doubler circuit whose output is filtered by capacitors 142 and 144 and supplies three hundred seventy-five volts to the decade counter.

Figure 6:
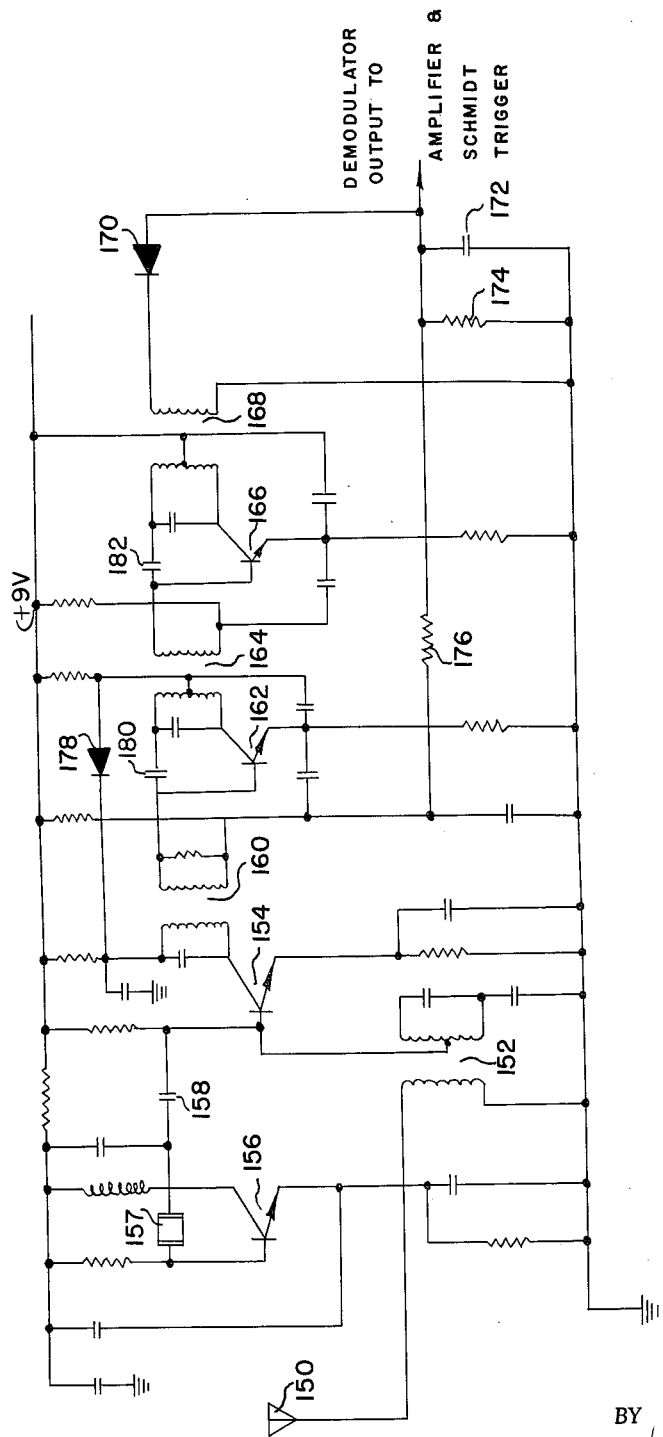
FIG. 6 is a schematic representation of a radio receiver which may be employed in the illustrative embodiment of FIG. 3.

Referring now to FIGURE 6, which is a schematic representation of the radio frequency receiver 31 of FIG. 3, the signal radiated from the transmitter antenna 82 of FIG. 4 is absorbed by antenna 150 which is tuned to the desired radio carrier frequency by the radio frequency transformer 152. This energy is then fed to the base of transistor 154 where it is mixed with a radio frequency signal produced by oscillator transistor 156 as controlled by crystal 157. This oscillator frequency is coupled to the base of transistor 154 through capacitor 158. The oscillator is purposely designed to produce a radio frequency higher than the frequency of the signal radiated by the transmitter. Consequently, when the two radio frequency signals are superimposed upon the base of transistor 154, an intermediate frequency is produced. This frequency is the numerical difference between the two main radio frequencies. For instance, if the oscillator 156 were designed to oscillate at 27,455 megacycles, and if the transmitter were designed to radiate at a carrier frequency of 27,000 megacycles, then an intermediate frequency of 27,455 minus 27,000, or .455 megacycles (455 kilocycles), would be produced at the base of transistor 154. All three of these frequencies are amplified by transistor 154 and fed into transformer 160. However, transformer 160 can be specifically designed to resonate at 455 kilocycles. Therefore, the higher frequencies are filtered and only the 455 kilocycle IF frequency is passed on to transistors 162 and 166 for further amplification. Transformers 164 and 168 provide further filtering and permit precise tuning of the 455 IF frequency. From transformer 168 if IF frequency is demodulated by means of diode 170, capacitor 172 and resistor 174. Automatic gain control for weak signals is provided by the return loop through resistor 176, and strong signal automatic gain control is provided by the return loop through diode 178. Neutralization of the last two IF stages is provided by means of the return loops through capacitors 180 and 182. All other circuit elements are employed to properly bias the individual transistors and/or perform conventional tuning, bypass, and/or filtering functions in a manner well known in the art.

Figure 7:
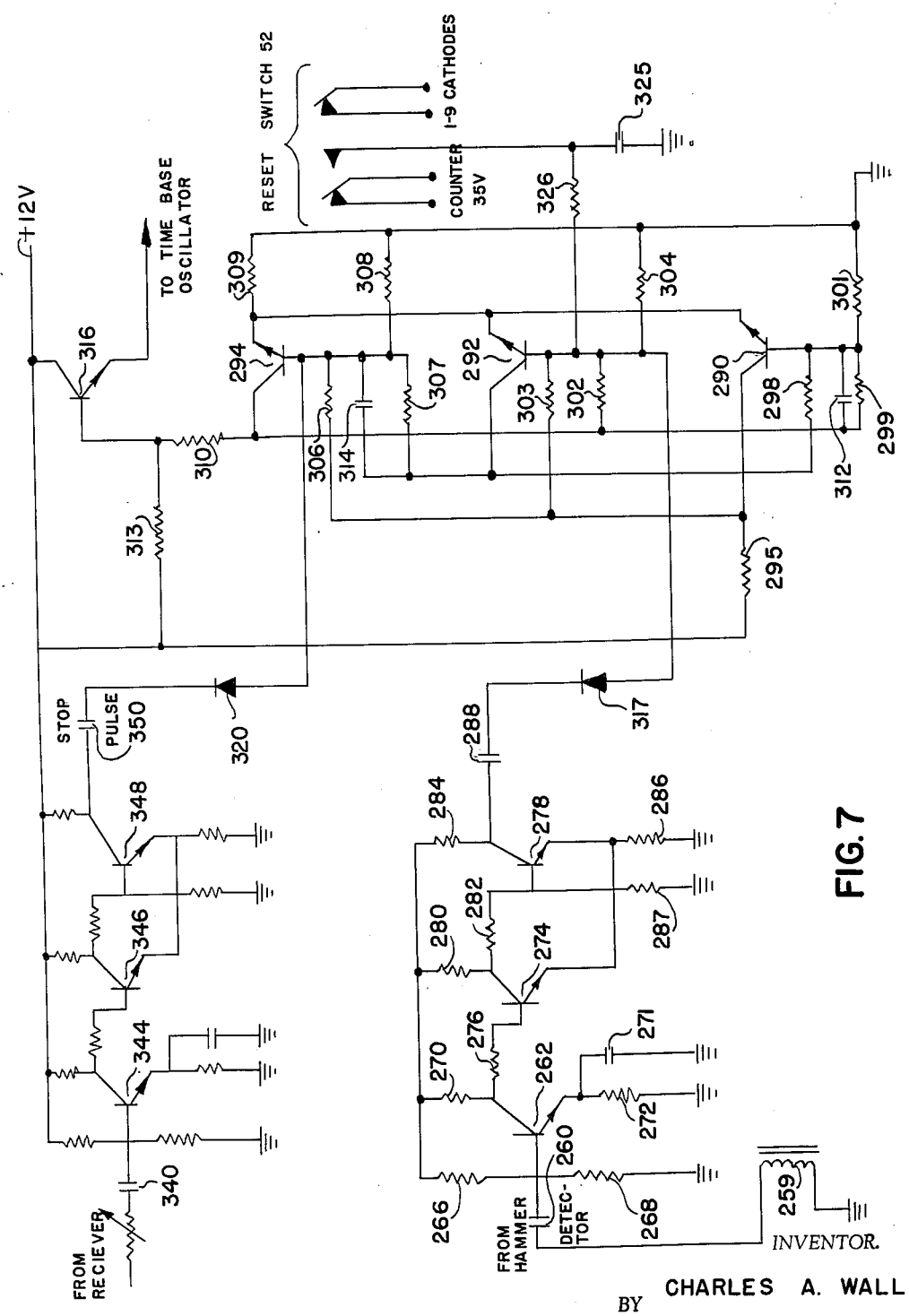
FIG. 7 is a schematic representation of a logic network which may be employed in the illustrative embodiment of FIG. 3.

Referring now to FIGURE 7, which is a schematic representation of the networks 31, 35, 41 and 45 of FIG. 3, an alternating current signal is produced by strike detector 259 whenever a hammer is struck sharply against the ground nearby. This signal is coupled into the base of amplifier transistor 262 through capacitor 260. Resistors 266, 268, 270 and 272 form a biasing network for transistor 262 with capacitor 271 serving as a bypass for resistor 272. The amplified output from the collector of transistor 262 is coupled into the base of transistor 274 through resistor 276. Transistors 274 and 278 and resistors 280, 282, 284 and 286 form a regenerative input level sensitive pulse generator. Operation of the pulse generator is as follows.

Transistor 274 is normally held on by the current flowing through resistor 276 from the collector of transistor 262. While transistor 274 is on, resistors 282, 287 and 286 hold the base to emitter voltage of transistor 278 at a level insufficient to conduct. When the collector voltage of transistor 262 drops to the point that transistor 274 begins to turn off, the voltage at the collector of transistor 274 begins to rise and the voltage across resistor 286 begins to drop. A level at the base of transistor 278 is reached where this transistor begins to turn on. This raises the voltage across resistor 286 which causes the level at the emitter of transistor 274 to rise completing the turning off process of transistor 274. When the voltage at the collector of transistor 278 rises to the proper point, the entire process is reversed as transistor 274 turns on and transistor 278 turns off. The rapid change of state at the collector of transistor 278 causes a differentiated pulse of fast rise time to be developed across capacitor 288.

The pulse from capacitor 288 is coupled into a three-state ring counter through diode 317. The three-state ring counter circuit includes transistors 290, 292 and 294, resistors 298, 299 and 301 through 309, and capacitors 312 and 314. For this circuit, two transistors are always off and the remaining transistor is on. For instance, in the "reset" or "ready to count" mode, transistor 292 is on and transistors 290 and 294 are off; in the "count" mode transistors 290 and 292 are off whereas transistor 294 is on; and in the "stop and hold" mode transistors 292 and 294 are off whereas transistor 290 is on. In order to establish the initial "reset" or "ready to count" mode, reset switch 323 applies 35 volts to transient filter capacitor 325 through resistor 326 to the base of transistor 292. Thus, transistor 292 is turned on and rendered conducting. Transistor 292 is held "on" because of the potential supplied to the base connection of transistor 292 from the collectors of transistors 290 and 294 through the two resistors 303 and 302, respectively. Transistors 290 and 294 are held in the "off" or non-conducting state because the potential supplied to their respective bases is insufficient to render them conducting. For instance, a small potential is supplied to the base of transistor 290 through resistor 299 from the collector of transistor 294 which is off. However, since transistor 292 is "on" it cannot provide the additional potential to the base of transistor 290 through resistor 298 necessary for transistor 290 to be turned on. Similarly, the base of transistor 294 is supplied only a portion of the total potential required for a change of state from the collectors of transistor 290 through resistor 306. Since transistor 292 is conducting it cannot provide this additional potential through resistor 307 required to render transistor 294 conducting. With transistor 294 "off" the current flow through resistor 313 is insufficient to render transistor 316 conducting. Therefore, the counter cannot operate as long as this condition exists.

When a negative pulse is received through diode 317 and applied to the base of transistor 292, the base potential is thus lowered to a point wherein transistor 292 momentarily becomes non-conducting. Concurrently, the base potential of transistor 294 is momentarily raised sufficiently through capacitor 314 to permit transistor 294 to become conducting. The result of these momentary events occurring simultaneously is that transistor 292 is turned "off," transistor 294 is turned "on," transistor 316 becomes conducting, thus applying power to the time base oscillator and starting the counter.

The counting cycle will continue until a negative pulse is received through diode 320 and applied to the base of transistor 294. When this occurs, the base potential of transistor 294 is momentarily lowered thus rendering transistor 294 non-conducting. Concurrently, the base potential of transistor 290 is momentarily raised through capacitor 312 thereby rendering transistor 290 conducting. The result of these simultaneous events is that transistor 290 is turned on, transistor 294 is turned off and transistor 316 is turned off removing power from the time base oscillator which stops the counter.

The negative pulse delivered through diode 320 which stopped the counter originated in the radio receiver 36 of FIG. 3 and was delivered through coupling capacitor 340 to transistors 342, 344 and 346. The function of these three transistor stages is identical to the function of transistors 262, 274 and 278 previously described.

Figures 8, 9:
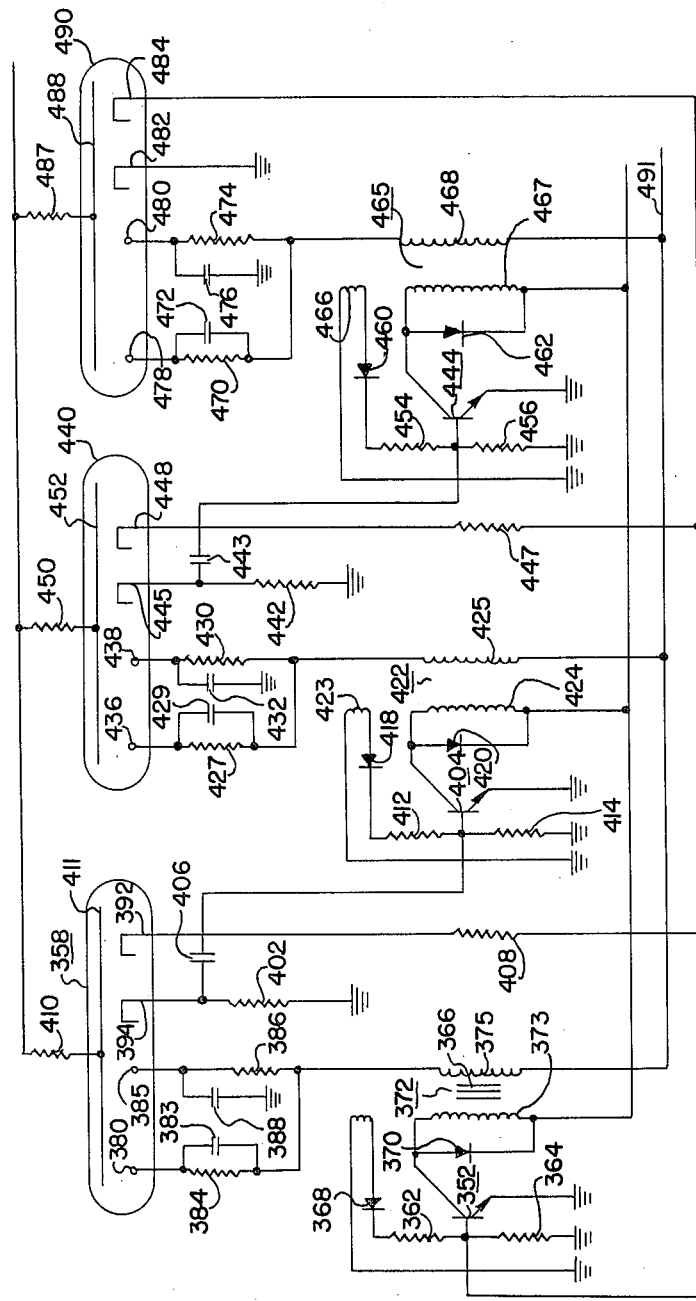
FIG. 8 is a schematic representation of one form of a decade counter which may be employed in the embodiment of FIG. 3.
FIG. 9 is a time plot of various wave forms existing in the decade counter of FIG. 8.

Referring now to FIG. 8, which is a schematic representation of the time base and decade counter network in which the time base for the decade counter is composed of capacitor 342, resistors 344, 345 and 348, and unijunction transistor 350, which are arranged in a relaxation oscillator circuit, capacitor 342 charges through resistor 344 until it reaches the firing voltage of transistor 350. When transistor 350 fires, a pulse is developed across resistor 348. The pulse across resistor 348 is coupled into the base of transistor 352 through diode 353. Resistor 345 provides additional temperature and voltage stability to the oscillator circuit.

The first decade counting tube 358 is driven by the one shot multivibrator comprising resistors 362, 364, transistor 352, diodes 368 and 370, and transformer 372. When a pulse is injected into the base of transistor 352 from the unijunction transistor oscillator through diode 353 transistor 352 is turned on. Current flows through winding 373 on transformer 372 where the regeneration through the coupling to winding 375 causes the transistor to hold itself on until the core 366 saturates. When the core saturates the transistor turns off and the energy stored in the core is dissipated in diode 370. Diode 368 blocks the trigger pulse from the feedback winding 375 so that the current will be diverted into the base of transistor 352. The square pulse generated by the one shot multivibrator is applied to the first guide 380 of the glow transfer tube 358 through the differentiating network comprising capacitor 383 and resistor 384. The square pulse developed by the one shot multivibrator is also applied to second guide 385 of tube 358 through integrating network comprising resistor 386 and capacitor 388. The pulse voltages, in idealized form, are seen in FIG. 9 in which 390 is the 35 volt bias level for the cathodes 392 and 394; 395 is the pulse as generated by the one shot multivibrator; 396 is the differentiated pulse appearing on the first guide, 380; 400 is the integrated pulse appearing on the second guide 385.

When the flow is resting on the zero cathode, a positive potential is developed across resistor 402 which triggers transistor 404 in the one shot multivibrator of the second decade counter tube through capacitor 406. Resistor 408 balances out the 1 to 9 cathode 392 so as to create the same conditions that are created by resistor 402 in connection with the zero cathode 394. Resistor 410 limits the amount of current through anode 411 as the glow transfer tube is essentially a constant voltage device.

The second decade has a one shot multivibrator comprising resistors 412 and 414, transistor 404, diodes 418 and 420, transformer 422 with windings 423, 424, 425. Resistor 427 and capacitor 429 comprise the differentiating network and resistor 430 and capacitor 432 comprise the integrating network for the first guide 436 and the second guide 438, respectively, in glow transfer tube 440. Resistor 442 produces a pulse which is coupled through capacitor 443 into the base of transistor 444 each time the zero cathode 445 is ignited. Resistor 447 balances out the 1 to 9 cathode 448 so as to create the same conditions that exist on the 0 cathode due to resistor 442. Resistor 450 limits the current to the anode 452. The operating principle of the second decade is the same as the first decade.

The third decade has a one shot multivibrator comprising resistors 454 and 456, transistor 444, diodes 460 and 462, transformer 465 with windings 466, 467, and 468. Resistor 470 and capacitor 472 comprise the differentiating network and resistor 474 and capacitor 476 comprise the integrating network for the first guide 478 and the second guide 480, respecitvely, in the glow transfer tube 440. In the third decade the cathodes 482 and 484 of tube 485 contain no resistors in their leads because it is not necessary to generate a pulse for another decade. Resistor 487 limits the current to the anode 488. The operating principle of the third decade is the same as the first decade.

Resetting of the three decades to zero cathodes is accomplished by opening the 35 volt guide bias line 491 and opening the 1 to 9 cathode line on all three glow transfer tubes.

Figure 10:
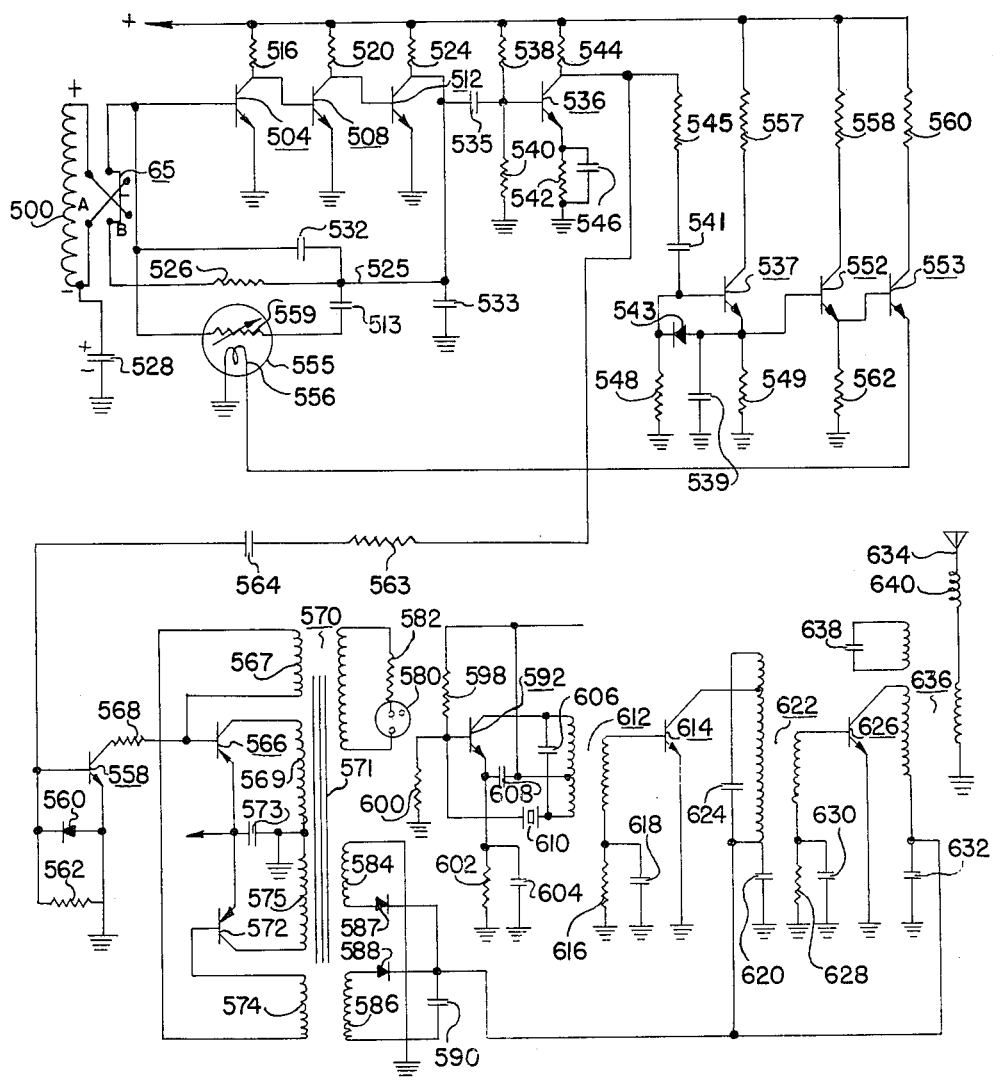
FIG. 10 is a schematic representation of seismic pick-up and radio pulse transmitter which may be employed in the embodiment depicted in block form in FIG. 4.

FIG. 10 is a schematic representation of the seismic pickup-amplifier-pulse transmitter shown in block form in FIG. 4. Seismic vibrations are detected by moving coil pickup 500 and are amplified by the direct coupled amplifier consisting of transistors 504, 508 and 512, and resistors 516, 520 and 524; D.C. stability of the amplifier is assured by the D.C. feedback loop 525 extending from the collector of transistor 512 through resistor 526 to the negative side of detector 500. Capacitor 528 decouples the D.C. feedback through resistor 526 and because at frequencies below those of interest capacitor 528 can no longer effectively bypass resistor 526, it provides low frequency attenuation.

Capacitor 532 provides increased negative feedback at frequencies above those of interest and therefore attenuates those frequencies. Capacitor 533 provides additional high frequency attenuation by shunting the higher frequencies to ground.

Capacitor 535 couples the direct coupled amplifier to the base of transistor 536 which is biased by resistors 538, 540, 542 and 544. Capacitor 546 bypasses resistor 542. The signal from the collector of transistor 536 is coupled into the base of transistor 537 by resistor 545 and capacitor 541. The base-to-emitter diode of transistor 537 functions as a peak detector whose signal current is amplified by the current gain of transistor 537 and charges capacitor 539. Diode 543 functions to balance the signal distortion of the base to emitter diode of transistor 537 thus maintaining the potential across capacitor 539 at the proper level. Resistors 548 and 549 drain off the leakage currents of transistor 537 and capacitor 540.

Transistors 552 and 553 operate in the common collector mode and their current gain raises the reflected impedance of the automatic gain control element 555. Resistors 557, 558 and 560 limit the currents through transistors 537, 552, and 553, respectively. Resistor 562 drains high temperature leakage currents of transistors 552 and 553 to ground.

The automatic gain control element 555 contains an incandescent lamp 556 and photo resistive element 559. The lamp's brightness is controlled by the potential on capacitor 539 as current amplified by transistors 552 and 553. The brightness of the lamp controls the resistivity of the photo resistive element. As the resistance of photo resistive element 559 varies the amount of negative feedback which occurs from the collector of transistor 512 through capacitor 513 and photoresistive element 559 to the base transistor 504 is varied, thus varying the gain of the direct coupled amplifier section.

The output of the seismic amplifier, specifically the collector current of transistor 536, is connected to a level detector including transistor 558, diode 560, and resistor 562. Coupling is accomplished through resistor 563 and capacitor 564. When the forward voltage of the emitter-to-base diode of the level detecting transistor 536 is exceeded by the seismic signal amplified, transistor 536 conducts and current flows through the base of transistor 566 by way of resistor 568. Diode 560 and resistor 562 balance out the clipping action of transistor 558 and maintain the proper D.C. level across capacitor 564.

When the level detecting transistor 558 draws current through the base of transistor 566 the transistor turns on and is held in the conducting condition by the regenerative feedback effect of winding 567 coupled to winding 569 on transformer 570. Transistor 566 remains conducting due to the regenerative condition until the core 571 of transformer 570 saturates, at which time regenerative action ceases and transistor 566 turns off. As transistor 566 turns off transistor 572 turns on due to the phasing of winding 574. Regeneration in winding 574 maintains transistor 572 in the on condition due to the coupling of windings 575 and 574. Transistor 572 remains in the conducting condition until the core 571 of transformer 570 saturates at which time transistor 572 is turned off and transistor 566 is turned back on. This process continues until capacitor 573 is discharged to a level at which proper operation cannot be sustained and operation ceases. After the converter has stopped operating capacitor 573 recharges through resistor 577. The collector voltage of transistors 566 and 572 is stepped up by the transformer action of transformer 570 to sufficient voltage to fire the gas lamp 580. Resistor 582 limits the current to the gas lamp 580. Windings 584 and 586 provide current at the proper voltage to rectifiers 587 and 588 which together with capacitor 590 provide filtered direct current to the transmitter section.

The transmitter incorporates a continuously running oscillator including transistor 592, resistors 598, 600, and 602, capacitors 604, 606, and 608, crystal 610, and transformer 612. The resistors bias the transistor at the appropriate operating point and capacitors 608 and 604 bypass the RF signal. The transistor operates in the common emitter configuration with base drive provided through crystal 610. Transformer 612 is tuned to the operating frequency by capacitor 606.

The first RF amplifier includes transistor 614 operating in the common emitter configuration with its base driven by transformer 612 and biased by resistor 616 and bypassed by capacitors 618 and 620. The load for transistor 614 is provided by transformer 622 which is tuned to the operating frequency by capacitor 624.

The second RF amplifier includes transistor 626 operating in the common emitter configuration with its base driven by transformer 622 and biased by resistor 628 and bypassed by capacitors 630 and 632. The load for transistor 626 is provided by the whip antenna 634 through the secondary winding of transformer 636 which is tuned to the operating frequency by capacitor 638. The antenna is tuned to the operating frequency by the loading coil 640.

The purpose of the polarity switch 65 of FIG. 10 is to permit the operator to select the polarity of seismic signals being fed into the direct coupled amplifier from seismic detector 500. Through this action the operator can gain extended depth capability without an increase in seismic energy at the shock source. This is possible because of the nature of seismic propagation, the nature of the seismic detector 500 and features of the direct coupled amplifier which were specifically designed to permit this capability. For instance, whenever a seismic shock is created, the waves resulting from this shock travel along the surface of the earth in much the same manner that water waves travel along the surface of a quiet pool whose surface has been distributed. However, the amplitude of these seismic waves is quite variable. The amplitude of the first wave is very small in comparison with the second, third, and fourth wave. As these waves pass the location of seismic detector 500, seismic detector 500 is displaced vertically by their passage. This displacement results in the generation of an alternating signal by seismic detector 500 whose polarity and amplitude are proportional to the polarity and amplitude of the seismic wave. For instance, as seismic detector is displaced vertically in an upward direction, and electrical signal of positive polarity is produced. After the crest of the first positive half of the seismic wave has passed, seismic detector 500 is displaced vertically downward and an electrical signal of negative polarity is produced. However, the amplitude of the first negative displacement, due to the following negative half wave, is always several times greater than the amplitude of the initial positive displacement. Were it not for a very complex phenomenon of drastic variation in frequency of the seismic waves near the shock source, this negative half wave could be used at all times as a basis for timing its travel. However, accuracy demands that the first positive wave be used for all survey work conducted when seismic detector 500 is within approximately 60 feet of the seismic shock source. Thereafter, the first negative seismic wave may be used with no compromise in accuracy if due notation is made of the time factor involved between the arrival of the first half wave and the arrival of the second half wave.

Now referring again to FIG. 10, position A of polarity switch 65 permits electrical signals from seismic detector 500 to feed into the direct coupled amplifier in the same phase as generated. Thus, the first position half wave introduced into the base of transistor 504 emerges as a greatly amplified positive pulse at the collector of transistor 558. All negative half waves are attenuated because of the grounded emitters of transistors 504, 508 and 512, and because of the bias network of transistor 536. In order to now utilize the greater amplitude of the first negative half wave it is necessary only to switch polarity switch 65 to position B. This section switches the positive terminal of seismic detector 500 to ground through capacitor 528 and it likewise switches the negative terminal of seismic detector 500 to connect with the base of transistor 504. Thus polarity of signals from detector 500 is reversed. In this condition the first positive signal produced by seismic detector 500 is delivered to the base of transistor 504 as a negative signal which is thereafter greatly attenuated and consequently causes no positive pulse at the collector of transistor 558. However, the first negative pulse generated by seismic detector 500 is now delivered to the base of transistor 504 as a positive pulse which will be amplified and result in a positive pulse emerging from the collector of transistor 558. This pulse, as previously explained, causes a pulse to be radiated from antenna 634.

At a point along the survey, where the first positive arrival is of sufficient amplitude to be readily distinguishable above seismic background noises, switch 501 may be switched to position B in order to determine the time interval existing between the peak amplitude of the first positive half wave and the first negative half wave. The difference in arrival time is noted and is thereafter used to correct all second arrival or negative half wave readings. For instance, if a reading of 30 milliseconds is taken with the switch in position A at a distance of 60 feet from the shock origin, position B of the switch would provide a reading in the range of 34 milliseconds. Thus, the time interval between the positive half wave and the negative half wave is 34 minus 30, or 4 milliseconds. All subsequent readings taken in position B should be corrected by subtracting 4 milliseconds from the observed readings.

While I have shown and described certain illustrative embodiments of this invention, it is understood that the concepts thereof could be incorporated in other embodiments without departitng from the spirit and scope of this invention.

What is claimed is:

1. In a seismic prospecting apparatus, the combination comprising a geophone located at first point on the earth's surface for detecting a seismic impulse and delivering an electrical signal output in response thereto, direct digital time reading counter means located at first point and coupled to said strike detector for receiving said output signal and starting a count upon reception thereof, seismic transducer means positioned at a second point on the earth's surface remote from said geophone to receive a seismic wave and deliver an electrical output signal in response thereto, a transmitting antenna at said second point, a radio frequency transmitter coupled to said seismic transducer means and to said antenna for transmitting a stop signal in response to the reception of an output signal from said transducer means, a receiving antenna, and radio frequency receiver means coupled between said counter means and said receiving antenna for stopping said counter means in response to a signal received from said transmitting antenna whereby said counter means provides a digital reading in milliseconds of the seismic impulse transmission time.

2. The combination according to claim 1 further comprising polarity reversing means between said seismic transducer means and said transmitter for causing said transmitter to produce an output signal in response to a second seismic impulse.

3. The combination according to claim 1 wherein said apparatus comprises at least one audio amplifier coupled between said seismic transducer means and a portion of said transmitter and a variable feedback means coupled from the output of said amplifier to the input of said amplifier.

4. The combination according to claim 1 wherein said transmitter comprises means for normally maintaining said transmitter in a quiescent condition and means for triggering said transmitter to transmit a single output pulse in response to the receipt of an output signal from said seismic transducer means.

5. The combination according to claim 4 wherein said transmitter comprises an oscillator and means for maintaining said oscillator in a condition of oscillation at a subdued level and wherein said oscillator is energized into full power operation by an impulse from said seismic transducer means.

6. In a radio-link seismic prospecting apparatus, a radio frequency receiver located at a first point on the earth's surface, a timing counter having a signal terminal and located at said first point and a stop signal terminal, a strike detector located at said first point, logic means coupling said detector and said receiver to said start and stop terminals, respectively, wherein a first pulse from said detector starts said counter and a first pulse from said receiver stops said counter, transmitter means located at a second point on the earth's surface including means normally maintaining said transmitter means in a quiescent condition and means including a seismic transducer for triggering said transmitter means to transmit a single stop signal in response to the reception of a seismic signal by said transducer whereby said counter indicates the time interval between start and stop signals.

7. Apparatus according to claim 6 wherein said timing counter is a digital counter having a plurality of decade stages calibrated in units and decimal fractions of milliseconds to provide a direct reading of the elapsed transmission time of the seismic signal.

8. A method of seismic surveying comprising the steps of producing a seismic impulse at a first point, starting a direct reading digital counter with the resulting seismic disturbance, detecting the seismic disturbance at a second point remote from the first point, transmitting a radio frequency signal from said second point in response to the detection of the seismic impulse, receiving said signal with a radio frequency receiver at said first point, and stopping said counter in response to the reception of said signal.

9. The method according to claim 8 including the step of switching said detector to respond to the first negative seismic impulse.

References Cited by the Examiner

UNITED STATES PATENTS

| 2,212,988 | 8/40 | Kirk | 181—0.5 |
| 2,479,772 | 8/49 | Peterson | 181—.5 X |
| 2,980,884 | 4/61 | Kaasa | 340—15.5 |

FOREIGN PATENTS 1,313,189  11/62  France.

SAMUEL FEINBERG, *Primary Examiner.*

BENJAMIN A. BORCHELT, *Examiner.*

---

UNITED STATES PATENT OFFICE
CERTIFICATE OF CORRECTION

Patent No. 3,213,413             October 19, 1965

Charles A. Wall

It is hereby certified that error appears in the above numbered patent requiring correction and that the said Letters Patent should read as corrected below.

Column 1, line 61, strike out "a", second occurrence; column 4, line 18, for "922" read -- 92 --; column 8, line 5, for "regative" read -- negative --; line 8, after "base" insert -- of --; column 9, line 8, for "distributed" read -- disturbed --; column 10, line 15, before "first" insert -- said --; line 16, for "strike detector" read -- geophone --; line 57, for "having a signal terminal" read -- having a start signal terminal and a stop signal terminal --; line 58, strike out " and a stop signal terminal".

Signed and sealed this 5th day of July 1966.

(SEAL)

Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,213,413                      October 19, 1965

Charles A. Wall

It is hereby certified that error appears in the above numbered patent requiring correction and that the said Letters Patent should read as corrected below.

Column 1, line 61, strike out "a", second occurrence; column 4, line 18, for "922" read -- 92 --; column 8, line 5, for "regative" read -- negative --; line 8, after "base" insert -- of --; column 9, line 8, for "distributed" read -- disturbed --; column 10, line 15, before "first" insert -- said --; line 16, for "strike detector" read -- geophone --; line 57, for "having a signal terminal" read -- having a start signal terminal and a stop signal terminal --; line 58, strike out " and a stop signal terminal".

Signed and sealed this 5th day of July 1966.

(SEAL)
Attest:

ERNEST W. SWIDER                      EDWARD J. BRENNER
Attesting Officer                      Commissioner of Patents